(12) United States Patent
Douseki et al.

(10) Patent No.: US 12,260,290 B2
(45) Date of Patent: Mar. 25, 2025

(54) TWO-DIMENSIONAL CODE, GENERATION DEVICE, AND READING DEVICE

(71) Applicants: The Ritsumeikan Trust, Kyoto (JP); Nozaki Insatsu Shigyo Co., LTD., Kyoto (JP)

(72) Inventors: Takakuni Douseki, Shiga (JP); Yohei Fukumizu, Shiga (JP); Junichi Misawa, Kyoto (JP); Kentaro Kimura, Kyoto (JP)

(73) Assignees: The Ritsumeikan Trust, Kyoto (JP); Nozaki Insatsu Shigyo Co., LTD., Kyoto (JP)

( * ) Notice: Subject to any disclaimer, the term of this patent is extended or adjusted under 35 U.S.C. 154(b) by 0 days.

(21) Appl. No.: 18/421,208

(22) Filed: Jan. 24, 2024

(65) Prior Publication Data

US 2024/0185012 A1    Jun. 6, 2024

Related U.S. Application Data

(63) Continuation of application No. PCT/JP2022/029207, filed on Jul. 28, 2022.

(30) Foreign Application Priority Data

Aug. 3, 2021 (JP) .................................. 2021-127832

(51) Int. Cl.
G06K 7/14 (2006.01)
G06K 19/06 (2006.01)

(52) U.S. Cl.
CPC ..... G06K 7/1417 (2013.01); G06K 19/06037 (2013.01)

(58) Field of Classification Search
CPC ...................... G06K 7/1417; G06K 19/06037
(Continued)

(56) References Cited

U.S. PATENT DOCUMENTS 6,069,636 A * 5/2000 Sayuda ................. G06T 1/0021
345/589
7,264,174 B2 9/2007 Chang et al.
(Continued)

FOREIGN PATENT DOCUMENTS

JP    H09172537 A    6/1997
JP    H1044506 A    2/1998
(Continued)

OTHER PUBLICATIONS

Supplementary European Search Report dated Oct. 14, 2024 issued in corresponding EP 22852948 application (8 pages).
(Continued)

*Primary Examiner* — Michael G Lee
*Assistant Examiner* — David Tardif
(74) *Attorney, Agent, or Firm* — Millen, White, Zelano & Branigan; William F. Nixon

(57) ABSTRACT

A two-dimensional code 100 includes a plurality of lines L arranged in a second direction (X direction) at an interval S, and each line L includes a plurality of cells that indicate a plurality of bits and are arranged in series in a first direction (Y direction) orthogonal to the second direction. Each of the plurality of cells is either a first data cell 101 indicating a first value out of two values that the bits indicate, or a second data cell 102 indicating a second value out of the two values that the bits indicate. The first data cell includes a first density region 103 indicating the first value at a first position in the second direction. The second data cell includes a second density region 104 indicating the second value at the first position, and a third density region 105 adjacent to the second density region in the second direction. A difference in density between the first density region and the second density region is greater than a difference in density between the first density region and the third density region.

14 Claims, 10 Drawing Sheets

(58) Field of Classification Search
USPC .................................................. 235/462.01
See application file for complete search history.

(56) References Cited

U.S. PATENT DOCUMENTS

| | | | |
|---|---|---|---|
| 7,510,125 B2* | 3/2009 | Look ................ | G06K 19/06046 |
| | | | 235/494 |
| 2015/0108220 A1 | 4/2015 | Gu et al. | |
| 2015/0302421 A1* | 10/2015 | Caton .............. | G06K 19/06037 |
| | | | 705/17 |
| 2016/0012324 A1* | 1/2016 | Eschbach ......... | G06K 19/06056 |
| | | | 235/494 |
| 2019/0112400 A1 | 4/2019 | Sattler et al. | |
| 2021/0103786 A1* | 4/2021 | Yoshida ................ | H04L 9/0861 |
| 2022/0261569 A1* | 8/2022 | Taira .................... | G06K 7/1486 |

FOREIGN PATENT DOCUMENTS

| | | |
|---|---|---|
| JP | 2001169090 A | 6/2001 |
| JP | 2008-207362 A | 9/2008 |
| JP | 3203889 U | 4/2016 |
| WO | 2013168305 A1 | 11/2013 |

OTHER PUBLICATIONS

International Search Report PCT/JP2022/029207 dated Oct. 18, 2022 (pp. 1-2).
Notice of Reasons for Refusal in corresponding Japanese Patent Application No. 2021-127832 dated Oct. 7, 2022 (pp. 1-4) and English translation thereof (pp. 1-4).

* cited by examiner

TWO-DIMENSIONAL CODE, GENERATION DEVICE, AND READING DEVICE

TECHNICAL FIELD

The present disclosure relates to a two-dimensional code, a generation device, and a reading device. This application claims priority on Japanese Patent Application No. 2021-127832 filed on Aug. 3, 2021, the entire content of which is incorporated herein by reference.

BACKGROUND ART

Information is two-dimensionally coded to be digitally displayed or attached to the exterior of an article. For example, Japanese Utility Model Registration No. 3203889 proposes a rigid plate having a two-dimensional code formed on its surface. Thus, the information can be easily obtained by reading the two-dimensional code from the exterior of the article or from the digital display.

CITATION LIST

Patent Literature

PATENT LITERATURE 1: Japanese Utility Model Registration No. 3203889

SUMMARY OF INVENTION

Information is visualized and embedded in such a two-dimensional code. Therefore, the two-dimensional code does not take on a regular appearance. When such a two-dimensional code is digitally displayed or attached to the exterior of an article, it may impair the appearance. Therefore, a two-dimensional code in which information can be embedded without impairing the appearance is desired.

According to an embodiment, a two-dimensional code includes a plurality of lines arranged in a second direction at an interval, and each line includes a plurality of cells that indicate a plurality of bits and are arranged in series in a first direction orthogonal to the second direction. Each of the plurality of cells is either a first data cell indicating a first value out of two values that the bits indicate, or a second data cell indicating a second value out of the two values that the bits indicate. The first data cell includes a first density region indicating the first value at a first position in the second direction. The second data cell includes a second density region indicating the second value at the first position, and a third density region adjacent to the second density region in the second direction. A difference in density between the first density region and the second density region is greater than a difference in density between the first density region and the third density region.

According to an embodiment, a generation device is configured to generate a two-dimensional code. The two-dimensional code includes a plurality of lines arranged in a second direction at an interval, and each line includes a plurality of cells that indicate a plurality of bits and are arranged in series in a first direction orthogonal to the second direction. Each of the plurality of cells is either a first data cell indicating a first value out of two values that the bits indicate, or a second data cell indicating a second value out of the two values that the bits indicate. The first data cell includes a first density region indicating the first value at a first position in the second direction. The second data cell includes a second density region indicating the second value at the first position, and a third density region adjacent to the second density region in the second direction. A difference in density between the first density region and the second density region is greater than a difference in density between the first density region and the third density region.

According to an embodiment, a computer program is configured to cause a computer to operate as a generation device for generating a two-dimensional code. The computer program causes the computer to generate a two-dimensional code. The two-dimensional code includes a plurality of lines arranged in a second direction at an interval, and each line includes a plurality of cells that indicate a plurality of bits and are arranged in series in a first direction orthogonal to the second direction. Each of the plurality of cells is either a first data cell indicating a first value out of two values that the bits indicate, or a second data cell indicating a second value out of the two values that the bits indicate. The first data cell includes a first density region indicating the first value at a first position in the second direction. The second data cell includes a second density region indicating the second value at the first position, and a third density region adjacent to the second density region in the second direction. A difference in density between the first density region and the second density region is greater than a difference in density between the first density region and the third density region.

According to an embodiment, a reading device for reading a two-dimensional code includes: an input unit configured to input a captured image of the two-dimensional code; and a processing unit configured to process the captured image. The two-dimensional code includes a plurality of lines arranged in a second direction at an interval, and each line includes a plurality of cells that indicate a plurality of bits and are arranged in series in a first direction orthogonal to the second direction. Each of the plurality of cells is either a first data cell indicating a first value out of two values that the bits indicate, or a second data cell indicating a second value out of the two values that the bits indicate. The first data cell includes a first density region indicating the first value at a first position in the second direction. The second data cell includes a second density region indicating the second value at the first position, and a third density region adjacent to the second density region in the second direction. A difference in density between the first density region and the second density region is greater than a difference in density between the first density region and the third density region. The processing unit performs preprocessing on the captured image, applies reading positions, which are set in advance at the positions of the cells, to the captured image on which the preprocessing has been performed, and converts each of pixel values at the applied reading positions in the captured image into the first value or the second value.

According to an embodiment, a computer program is configured to cause a computer to operate as a reading device for reading a two-dimensional code. The two-dimensional code includes a plurality of lines arranged in a second direction at an interval, and each line includes a plurality of cells that indicate a plurality of bits and are arranged in series in a first direction orthogonal to the second direction. Each of the plurality of cells is either a first data cell indicating a first value out of two values that the bits indicate, or a second data cell indicating a second value out of the two values that the bits indicate. The first data cell includes a first density region indicating the first value at a first position in the second direction. The second data cell includes a second density region indicating the second value at the first position, and a third density region adjacent to the second density region in the second direction. A difference in density between the first density region and the second density region is greater than a difference in density between the first density region and the third density region. The computer is caused to execute: performing preprocessing on the captured image of the two-dimensional code; applying reading positions, which are set in advance at the positions of the cells, to the captured image on which the preprocessing has been performed; and converting each of pixel values at the applied reading positions in the captured image into the first value or the second value.

Further details will be described later as an embodiment.

DESCRIPTION OF EMBODIMENTS

Figure 1:
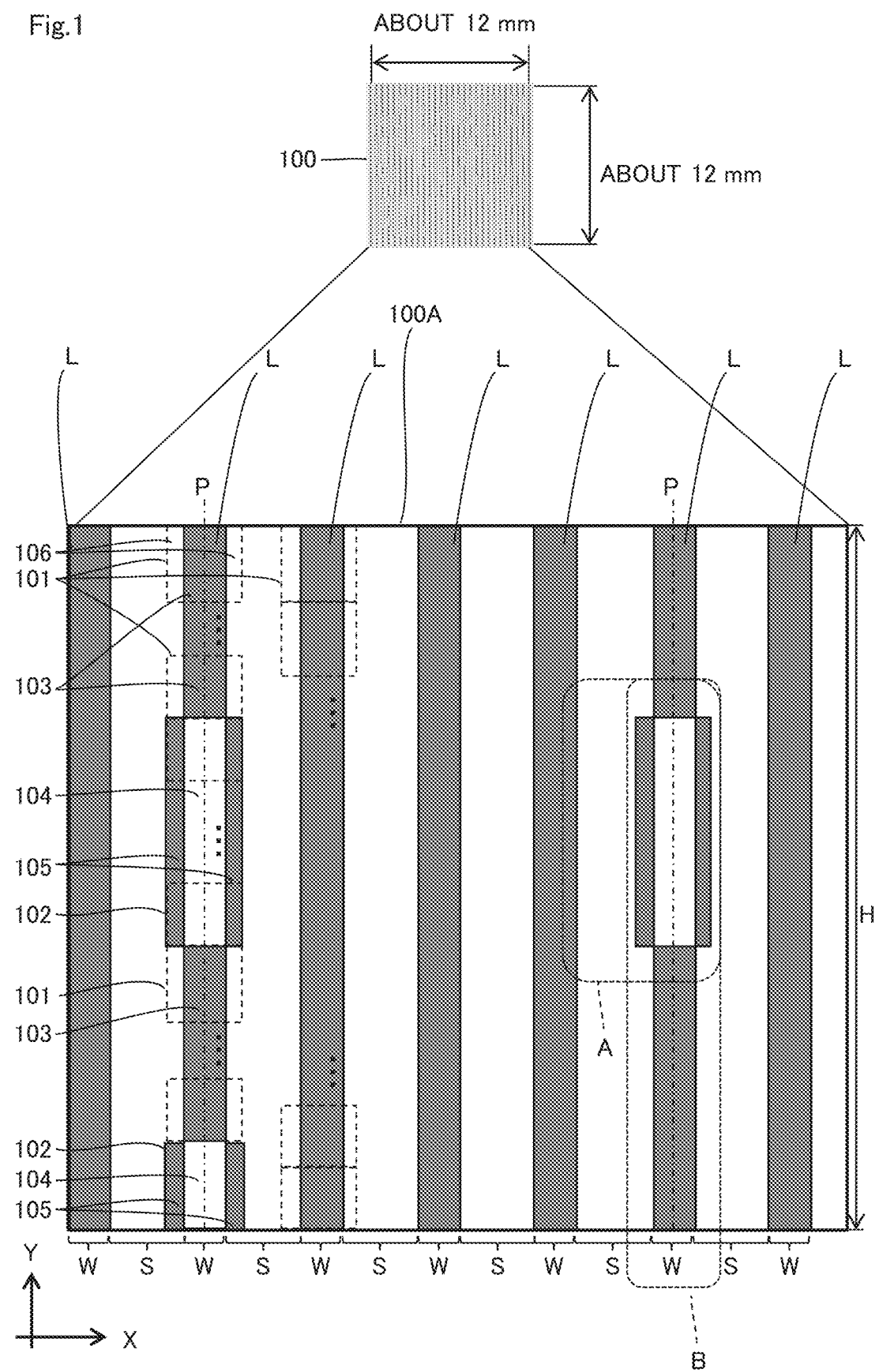
FIG. 1 is a schematic diagram showing an example of a two-dimensional code according to an embodiment of the present disclosure.

1. Outlines of Two-Dimensional Code, Generation Device, and Reading Device (1) A two-dimensional code according to an embodiment includes a plurality of lines arranged in a second direction at an interval, and each line includes a plurality of cells that indicate a plurality of bits and are arranged in series in a first direction orthogonal to the second direction. Each of the plurality of cells is either a first data cell indicating a first value out of two values that the bits indicate, or a second data cell indicating a second value out of the two values that the bits indicate. The first data cell includes a first density region indicating the first value at a first position in the second direction. The second data cell includes a second density region indicating the second value at the first position, and a third density region adjacent to the second density region in the second direction. A difference in density between the first density region and the second density region is greater than a difference in density between the first density region and the third density region.

The difference in density between the first density region and the second density region being greater than the difference in density between the first density region and the third density region is, for example, that the first density region and the third density region are high-density regions while the second density region is a low-density region, or that the first density region and the third density region are low-density regions while the second density region is a high-density region. The first data cells and the second data cells have the aforementioned density regions of different patterns for representing the first value and the second value, respectively, and are arranged in series in the first direction, whereby a line is formed in the first direction. This allows the entire two-dimensional code to have visual regularity, and provide an impression of being well-arranged. In addition, since each of the cells provided in the respective lines arranged in parallel represents the first value or the second value, the values are represented at the positions having regularity. This facilitates acquisition of the values from the two-dimensional code.

(2) Preferably, the third density region is arranged adjacent to opposite sides, in the second direction, of the second density region. This allows the area of the third density region to be sufficiently provided with respect to the second density region. As a result, reduction in density due to the second density region is inhibited in the two-dimensional code as a whole, thereby providing an impression of being well-arranged.

(3) Preferably, the interval is twice or more as large as a width of the lines. This allows the third density regions to be easily arranged.

(4) Preferably, the third density region is formed from an end to the other end, in the first direction, of the second data cell. Thus, a line is formed in the first direction. This allows the entire two-dimensional code to have visual regularity, and provide an impression of being well-arranged.

(5) A generation device according to the embodiment is configured to generate a two-dimensional code. The two-dimensional code includes a plurality of lines arranged in a second direction at an interval, and each line includes a plurality of cells that indicate a plurality of bits and are arranged in series in a first direction orthogonal to the second direction. Each of the plurality of cells is either a first data cell indicating a first value out of two values that the bits indicate, or a second data cell indicating a second value out of the two values that the bits indicate. The first data cell includes a first density region indicating the first value at a first position in the second direction. The second data cell includes a second density region indicating the second value at the first position, and a third density region adjacent to the second density region in the second direction. A difference in density between the first density region and the second density region is greater than a difference in density between the first density region and the third density region.

In the two-dimensional code generated as described above, the first data cells and the second data cells have the density regions of different patterns for representing the first value and the second value, respectively, and are arranged in series in the first direction, whereby a line is formed in the first direction. This allows the entire two-dimensional code to have visual regularity, and provide an impression of being well-arranged. In addition, since each of the cells provided in the respective lines arranged in parallel represents the first value or the second value, the values are represented at the positions having regularity. This facilitates acquisition of the values from the two-dimensional code.

(6) A computer program according to the embodiment is configured to cause a computer to operate as a generation device for generating a two-dimensional code. The computer program causes the computer to generate a two-dimensional code. The two-dimensional code includes a plurality of lines arranged in a second direction at an interval, and each line includes a plurality of cells that indicate a plurality of bits and are arranged in series in a first direction orthogonal to the second direction. Each of the plurality of cells is either a first data cell indicating a first value out of two values that the bits indicate, or a second data cell indicating a second value out of the two values that the bits indicate. The first data cell includes a first density region indicating the first value at a first position in the second direction. The second data cell includes a second density region indicating the second value at the first position, and a third density region adjacent to the second density region in the second direction. A difference in density between the first density region and the second density region is greater than a difference in density between the first density region and the third density region.

In the two-dimensional code generated by the computer according to the computer program, the first data cells and the second data cells have the density regions of different patterns for representing the first value and the second value, respectively, and are arranged in series in the first direction, whereby a line is formed in the first direction. This allows the entire two-dimensional code to have visual regularity, and provide an impression of being well-arranged. In addition, since each of the cells provided in the respective lines arranged in parallel represents the first value or the second value, the values are represented at the positions having regularity. This facilitates acquisition of the values from the two-dimensional code.

(7) A reading device according to the embodiment is a device for reading a two-dimensional code, and includes: an input unit configured to input a captured image of the two-dimensional code; and a processing unit configured to process the captured image. The two-dimensional code includes a plurality of lines arranged in a second direction at an interval, and each line includes a plurality of cells that indicate a plurality of bits and are arranged in series in a first direction orthogonal to the second direction. Each of the plurality of cells is either a first data cell indicating a first value out of two values that the bits indicate, or a second data cell indicating a second value out of the two values that the bits indicate. The first data cell includes a first density region indicating the first value at a first position in the second direction. The second data cell includes a second density region indicating the second value at the first position, and a third density region adjacent to the second density region in the second direction. A difference in density between the first density region and the second density region is greater than a difference in density between the first density region and the third density region. The processing unit performs preprocessing on the captured image, applies reading positions, which are set in advance at the positions of the cells, to the captured image on which the preprocessing has been performed, and converts each of pixel values at the applied reading positions in the captured image into the first value or the second value.

In the two-dimensional code, since each of the cells provided in the respective lines arranged in parallel represents the first value or the second value, the values are represented at the positions having regularity. Thus, the data can be easily read by applying the preset reading positions.

(8) Preferably, the preprocessing includes detecting the size and arrangement of the two-dimensional code, and converting at least one of the detected size and arrangement according to the reading positions. This allows the preset reading positions to be easily applied.

(9) A computer program according to the embodiment is configured to cause a computer to operate as a reading device for reading a two-dimensional code. The two-dimensional code includes a plurality of lines arranged in a second direction at an interval, and each line includes a plurality of cells that indicate a plurality of bits and are arranged in series in a first direction orthogonal to the second direction. Each of the plurality of cells is either a first data cell indicating a first value out of two values that the bits indicate, or a second data cell indicating a second value out of the two values that the bits indicate. The first data cell includes a first density region indicating the first value at a first position in the second direction. The second data cell includes a second density region indicating the second value at the first position, and a third density region adjacent to the second density region in the second direction. A difference in density between the first density region and the second density region is greater than a difference in density between the first density region and the third density region. The computer is caused to execute: performing preprocessing on the captured image of the two-dimensional code; applying reading positions, which are set in advance at the positions of the cells, to the captured image on which the preprocessing has been performed; and converting each of pixel values at the applied reading positions in the captured image into the first value or the second value.

In the two-dimensional code, since each of the cells provided in the respective lines arranged in parallel represents the first value or the second value, the values are represented at the positions having regularity. Thus, the data can be easily read by applying the preset reading positions.

2. Examples of Two-Dimensional Code, Generation Device, and Reading Device

Figure 2:
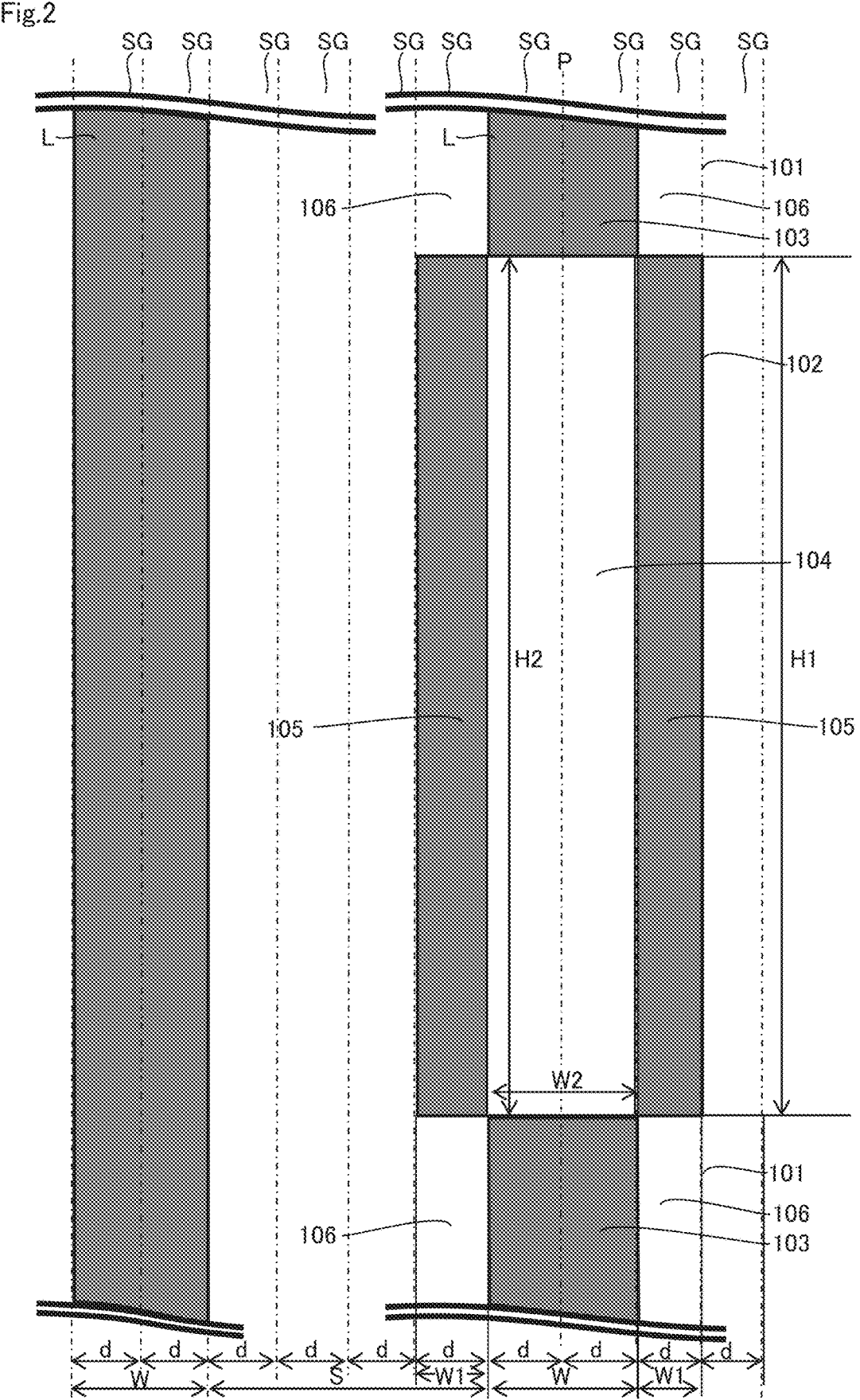
FIG. 2 is an enlarged view of a part A in FIG. 1.

FIG. 1 is a schematic diagram showing an example of a two-dimensional code 100 according to the present embodiment. A two-dimensional code 100A shown in FIG. 1 is an enlarged schematic view of the two-dimensional code 100. FIG. 2 is an enlarged view of a portion A in FIG. 1. In FIG. 1 and FIG. 2, the horizontal direction and the vertical direction are defined as an X direction and a Y direction, respectively. The rightward direction is the positive direction in the X direction, and the upward direction is the positive direction in the Y direction.

With reference to FIG. 1, the two-dimensional code 100 is, for example, a square having a length and a width of about 12 mm, and includes a plurality of lines L arranged in the X direction at intervals S. Each line L has a length (width) W in the X direction, and a length (height) H in the Y direction. The width W is sufficiently small with respect to the height H, and each line L has a vertically long shape. That is, the Y direction is the longitudinal direction, and the X direction is a direction (width direction) orthogonal to the longitudinal direction.

The two-dimensional code 100 is generated and outputted by a generation device 1 described later. The "output" means being displayed so as to be visually recognized by human eyes, for example, being digitally displayed on a display 15 of the generation device 1, being transmitted to another device and digitally displayed on the device, or being printed on paper or the like by a printer 16. The two-dimensional code 100 displayed as described above can be attached to the exterior of an article, and used.

A line L is obtained by arranging, in series in the Y direction, a plurality of cells for indicating a plurality of bits constituting data D. Each of the plurality of cells is either a first data cell 101 or a second data cell 102. Out of the values of 0 and 1 that the bits indicate, the first data cell 101 indicates 0 (first value) while the second data cell 102 indicates 1 (second value). The number of the cells arranged in series in the Y direction is, for example, 14. In this case, the line L can represent 14 bits of data.

Each first data cell 101 includes a first density region 103 indicating 0 at a first position P in the X direction. The first position P is a position inside the line L, for example, the center, in the X direction, of the line L. The first density region 103 refers to a region of a pixel value indicating a first density. The first density is higher than the density of a base color of the two-dimensional code 100, i.e., the color of the spaces between the lines L. When the color of the spaces between the lines L is white, the first density is, for example, black, and the pixel value indicating the first density is 0. This makes the first density region 103 easily visible.

Preferably, the first data cell 101 includes fourth density regions 106 that are adjacent to the first density region 103 in the X direction. Each fourth density region 106 refers to a region of a pixel value indicating a fourth density. The fourth density is substantially equal to the density of the base color of the two-dimensional code 100, i.e., the color of the spaces between the lines L. When the color of the spaces between the lines L is white, the fourth density is, for example, white, and the pixel value indicating the fourth density is 255. This makes the first density region 103 more easily visible.

The second data cell 102 includes a second density region 104 indicating 1 at the first position P. The second density region 104 refers to a region of a pixel value indicating a second density, and the second density is lower than the first density. When the first density is black, the second density is, for example, white, and the pixel value indicating the second density is 255. Thus, at the first position P in the line L, 0s and 1s are represented according to the density change.

Preferably, the second data cell 102 includes third density regions 105 that are adjacent to the second density region 104 in the X direction. Each third density region 105 refers to a region of a pixel value indicating a third density, and the third density is substantially equal to the first density. When the first density is black, the third density is, for example, black, and the pixel value indicating the third density is 0. In other words, a difference between the first density and the second density is greater than a difference between the first density and the third density. This makes the second density region 104 more easily visible.

Since the plurality of cells are arranged in series in the Y direction, the line L extends in the Y direction and can be visually recognized. The width W of the line L corresponds to the width of the first density region 103 of the first data cell 101.

As shown in FIG. 2, the two-dimensional code 100 is represented by a plurality of segments SG arranged continuously in the X direction. The segments SG are regions into which the code 100 is divided such that each segment SG has a width d and a height H. The width d is equivalent to, for example, 2 pixels.

For example, the width W of the line L is not smaller than 1.5 times and not larger than 3 times the width d of the segment SG (1.5 d≤W≤3 d). Preferably, the width W of the line L is not smaller than 1.8 times and not larger than 2.5 times the width d of the segment SG (1.8 d≤W≤2.5 d). For example, the width W of the line L is 2 d (W=2 d).

The interval S between adjacent lines L is not smaller than the width W of the line L (S≥W). Preferably, the interval S between adjacent lines L is not smaller than twice the width W of the line L (S≥2 W). Preferably, the interval S is not larger than 3 times the width W of the line L (S≤3 W). Thus, an adequate amount of information can be embedded in the two-dimensional code 100. For example, the interval S between adjacent lines L is 4 times the width d of the segment SG (S=4 d=2 W).

Thus, as shown in FIG. 1, the outputted two-dimensional code 100 looks like a roughly uniform gray rectangle to the human eyes. Therefore, although the presence of the two-dimensional code 100 is recognized, the code pattern thereof is difficult to see. As a result, when the two-dimensional code 100 is displayed or attached to the exterior of an article, the two-dimensional code 100 does not impair the appearance.

In an example described below, the width W of each line L is constant. This allows the two-dimensional code 100 to have overall uniformity and regularity, and provide an impression of being well-arranged. In another example, the width W of each line L may not necessarily be constant. In this case, the width W itself may be variable according to the data. This allows the data to be read via the width W of the line L.

A width W1 of the third density region 105 is substantially equal to half a width W2 of the second density region 104 (W1≈W2/2). The width W2 of the second density region 104 substantially matches the width of the first density region 103, matches the width W of the line L (W2≈W), and is twice the width d of the segment SG (W2=2 d). Therefore, the width W1 of the third density region 105 is substantially half the width W of the line L, and matches the width d of the segment SG (W1≈W/2=d). In addition, a height H1 of the third density region 105 is substantially equal to a height H2 of the second density region 104 (H1≈H2).

Thus, the area of the third density region 105 is substantially equal to the area of the second density region 104, and the density of the two-dimensional code 100 as a whole becomes substantially uniform. In addition, the black regions are continuous in the Y direction at the opposite ends, in the X direction, of the line L. Therefore, the line is visually recognized to be linear in the Y direction. This provides an impression that the entire two-dimensional code 100 has regularity.

Figure 3:
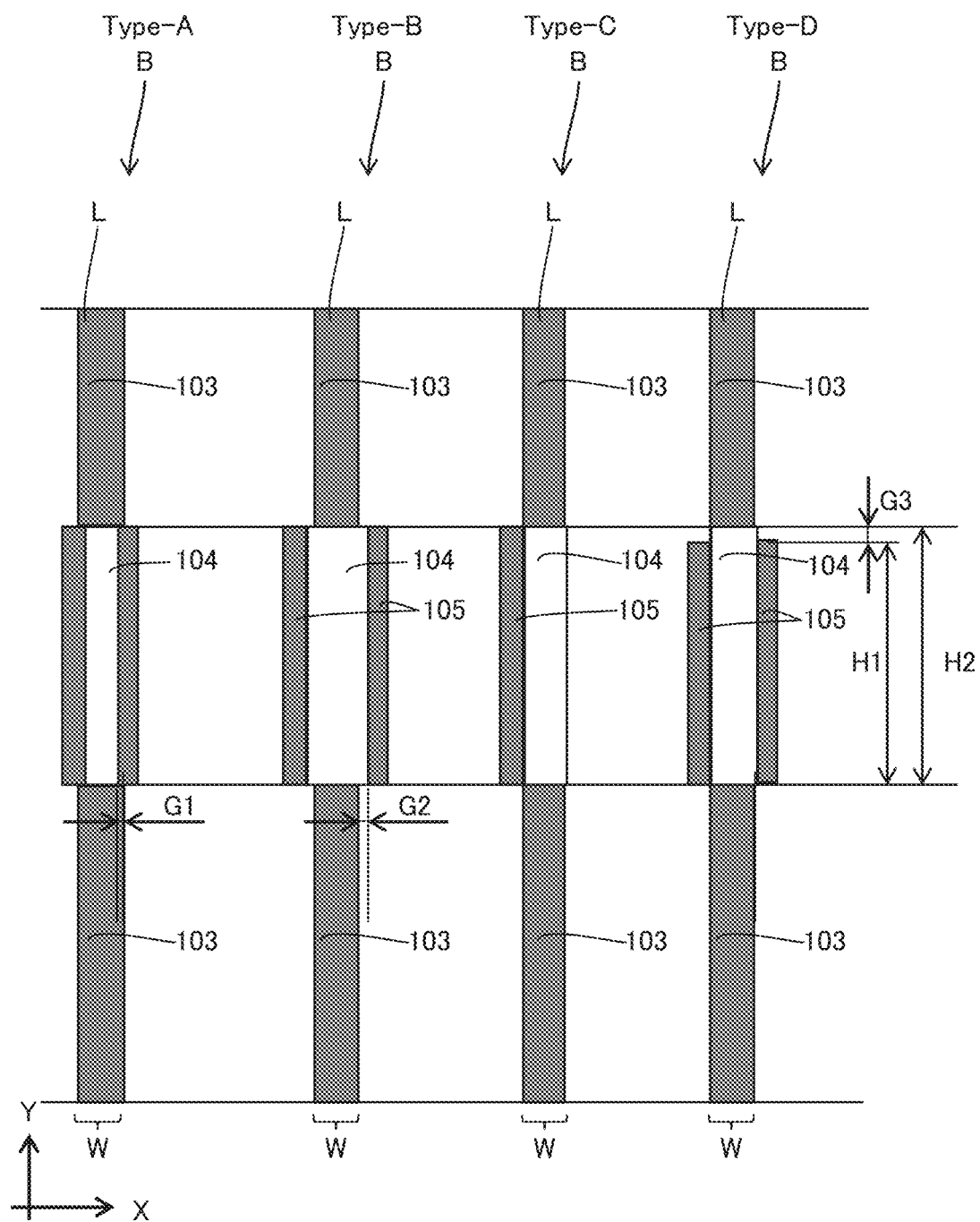
FIG. 3 shows another specific example of the part A in FIG. 1.

FIG. 3 is an enlarged view of a portion B in FIG. 1, and shows another specific example of the portion A. Specifically, with reference to FIG. 3, each third density region 105 may exist inside the line L (type A). In the type A shown in FIG. 3, the third density region 105 exists by a distance G1 inside the end, in the X direction, of the first density region 103. Alternatively, each third density region 105 may exist at a position away from the outer side of the line L (type B). In the type B shown in FIG. 3, a gap of a distance G2 is generated between the third density region 105 and an end, in the X direction, of the first density region 103. Alternatively, the third density region 105 may exist only on one side of the second density region 104 (type C). In the type C shown in FIG. 3, the third density region 105 is disposed only on the left side of the second density region 104, and is not arranged on the right side.

In any of the types A to C, the black regions are continuous in the Y direction at the end in the X direction of the line L. Therefore, the line is visually recognized to be linear in the Y direction. This provides an impression that the entire two-dimensional code 100 has regularity.

The height H1 of the third density region 105 may be somewhat smaller than the height H2 of the second density region 104 (type D). In the type D shown in FIG. 3, a gap of a distance G3 is generated between an upper end of the third density region 105 and a lower end of the second density region 104 in the Y direction (H1<H2). The distance G3 may be a distance that allows the density regions to be visually recognized as being continuous in the Y direction. Preferably, the distance G3 is shorter than half the height H2 of the second density region 104 (G3<H2/2). More preferably, the distance G3 is shorter than 80% of the height H2 of the second density region 104 (G3<H2×0.8). This allows the black regions to be continuous in the Y direction at the ends, in the X direction, of the line L when the two-dimensional code 100 is outputted with the size shown in FIG. 1, for example. Therefore, the line is visually recognized to be linear in the Y direction. This provides an impression that the entire two-dimensional code 100 has regularity.

Figure 4:
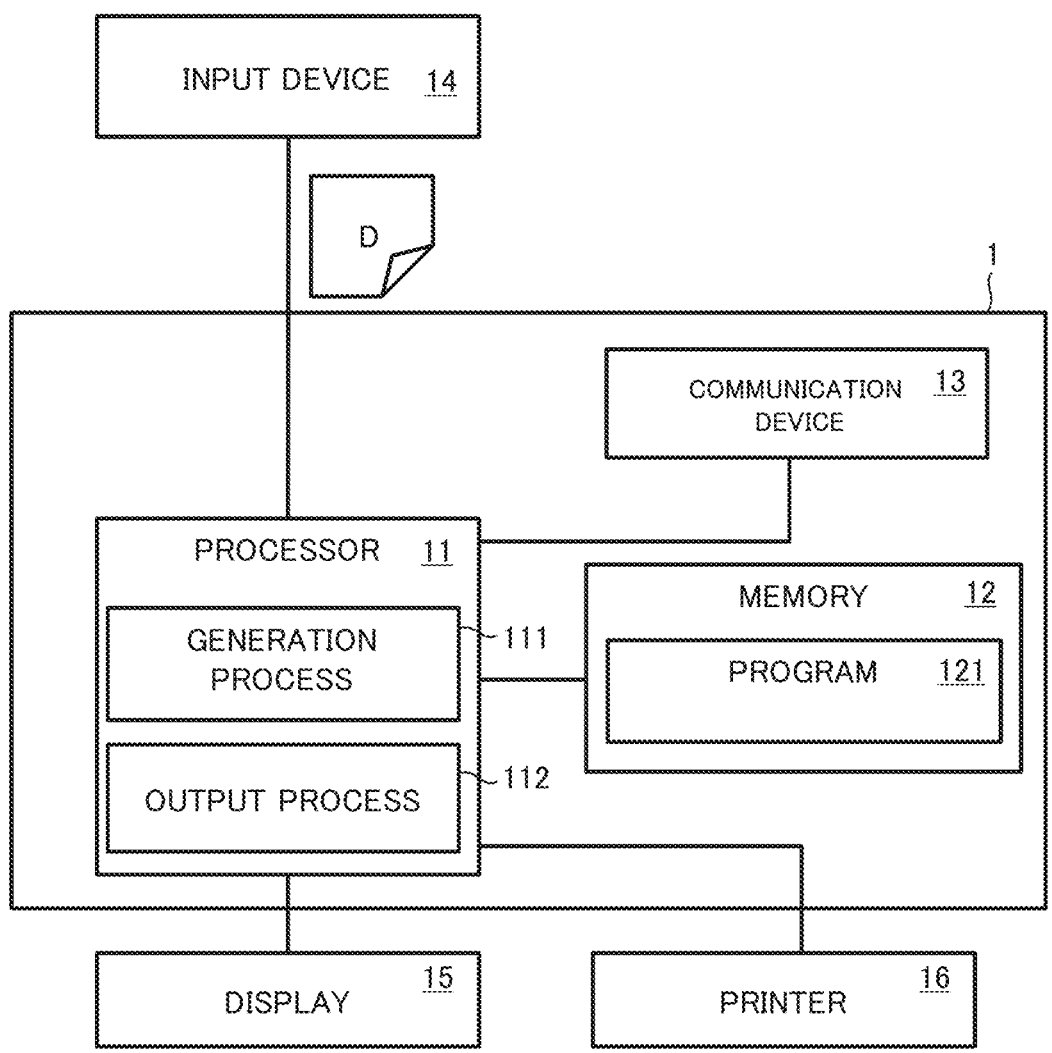
FIG. 4 is a schematic diagram showing a specific example of a configuration of a generation device according to the embodiment.

The two-dimensional code 100 according to the embodiment is generated by the generation device 1. FIG. 4 is a schematic diagram showing a specific example of the configuration of the generation device 1 according to the embodiment. The generation device 1 is composed of, for example, a general computer including a processor 11 and a memory 12. The processor 11 is, for example, a CPU (Central Processing Unit).

The memory 12 may be a primary storage device or a secondary storage device. The memory 12 has, stored therein, a program 121 to be executed by the processor 11. The processor 11 executes the program 121 stored in the memory 12 to execute arithmetic processing.

The generation device 1 is connected to an input device 14. The input device 14 is, for example, a keyboard or the like. Through the input device 14, data D to be embedded in the two-dimensional code 100 is inputted to the generation device 1. The data D is transferred to the processor 11.

The generation device 1 is connected to an output device that outputs the generated two-dimensional code 100. If output of the two-dimensional code 100 is digital display, the output device is, for example, the display 15. If the two-dimensional code 100 is transmitted to another device to be digitally displayed on the device, the output device is, for example, a communication device 13. Thus, the two-dimensional code 100 can be digitally displayed on the display 15 and the other device.

If output of the two-dimensional code 100 is printing the code 100 on paper or the like, the output device is, for example, the printer 16. Thus, the generated two-dimensional code 100 can be printed on paper or the like.

The arithmetic processing executed by the processor 11 includes a generation process 111. The generation process 111 includes generating the two-dimensional code 100 in which the data D is embedded. In the generation process 111, the processor 11 represents 0 or 1 as a component of the data in each of the cells of the line L.

Figure 5:
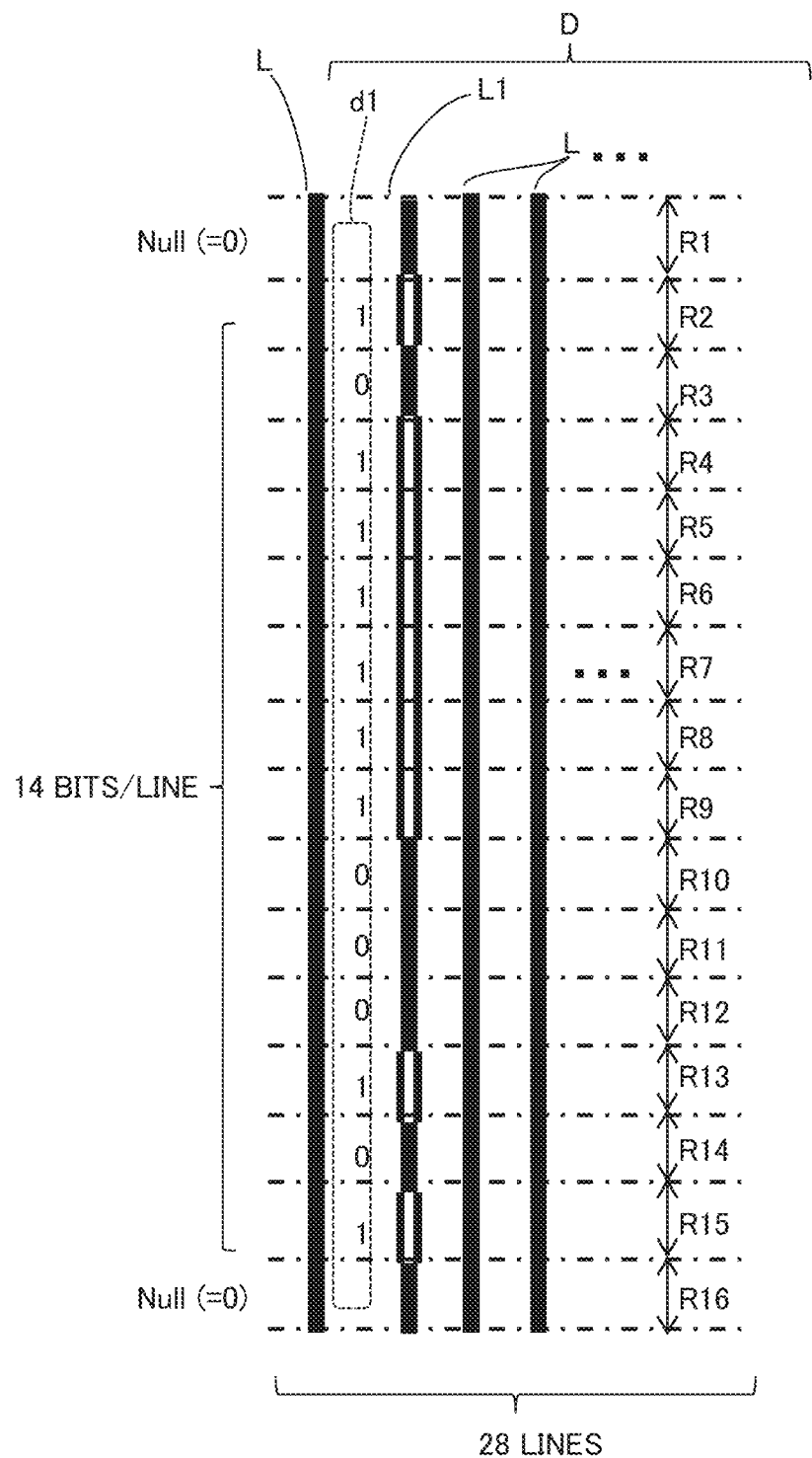
FIG. 5 illustrates a specific example of a two-dimensional code generation method.

Specifically, with reference to FIG. 5, for example, the two-dimensional code 100 has 28 lines L, and the processor 11 represents 14-bit values per line L. All the lines L may be used for data embedding, or at least a part of the lines L may be used for data embedding. For example, with two lines L at the both ends being excluded, 26 lines L may be used.

Each line L includes a plurality of cells R1 to R16 for indicating a plurality of bits. The cells R1 to R16 are continuously arranged in the Y direction. In the example shown in FIG. 5, in order to represent 14-bit values per line L, each line L includes cells R1 to R16. In this example, the top end cell R1 and the bottom end cell R16 are "Null", so that the values are represented using the cells R2 to R15.

The processor 11 assigns 0s and 1s as components of the data D to the cells R2 to R15 of each of the lines L in a prescribed order. For example, from left to right of the plurality of lines L, 0s and 1s as components of the data D are assigned to the cells R2 to R15 in order. The cells R1 and R16 of each line L, which are "Null", are treated as 0s, for example.

Assuming that 15th to 28th values (dl) of the data D are 1, 0, 1, 1, 1, 1, 1, 1, 0, 0, 0, 1, 0, 1, these values are respectively assigned to the cells R2 to R15 of a second line L1 from the left as shown in FIG. 5.

According to the values assigned to the respective cells, the processor 11 determines each cell to be either a first data cell 101 or a second data cell 102. Focusing on the line L1, the cells R1, R3, R10 to R12, and R14 to which 0s are assigned are determined to be first data cells 101, and the cells R2, R4 to R9, R13, and R15 to which 1s are assigned are determined to be second data cells 102.

Therefore, the cells R2, R4 to R9, R13, and R15 of the line L1 each include the white second density region 104, and the black third density regions 105 adjacent to the second density region 104. The cells R1, R3, R10 to R12, and R14 each include a first density region 103. Thus, the line L1 is visually recognized to be linear in the Y direction, and represents the values 1, 0, 1, 1, 1, 1, 1, 1, 0, 0, 0, 1, 0, 1.

The processor 11 similarly performs the generation process 111 on all the values of the data D, thereby generating the two-dimensional code 100 in which the data D is embedded.

The arithmetic processing executed by the processor 11 includes an output process 112. The output process 112 is a process for outputting the generated two-dimensional code 100, and includes, for example, causing the printer 16 to print the generated two-dimensional code 100. As another example, the output process 112 may include causing the display 15 to display the generated two-dimensional code 100.

Figure 6:
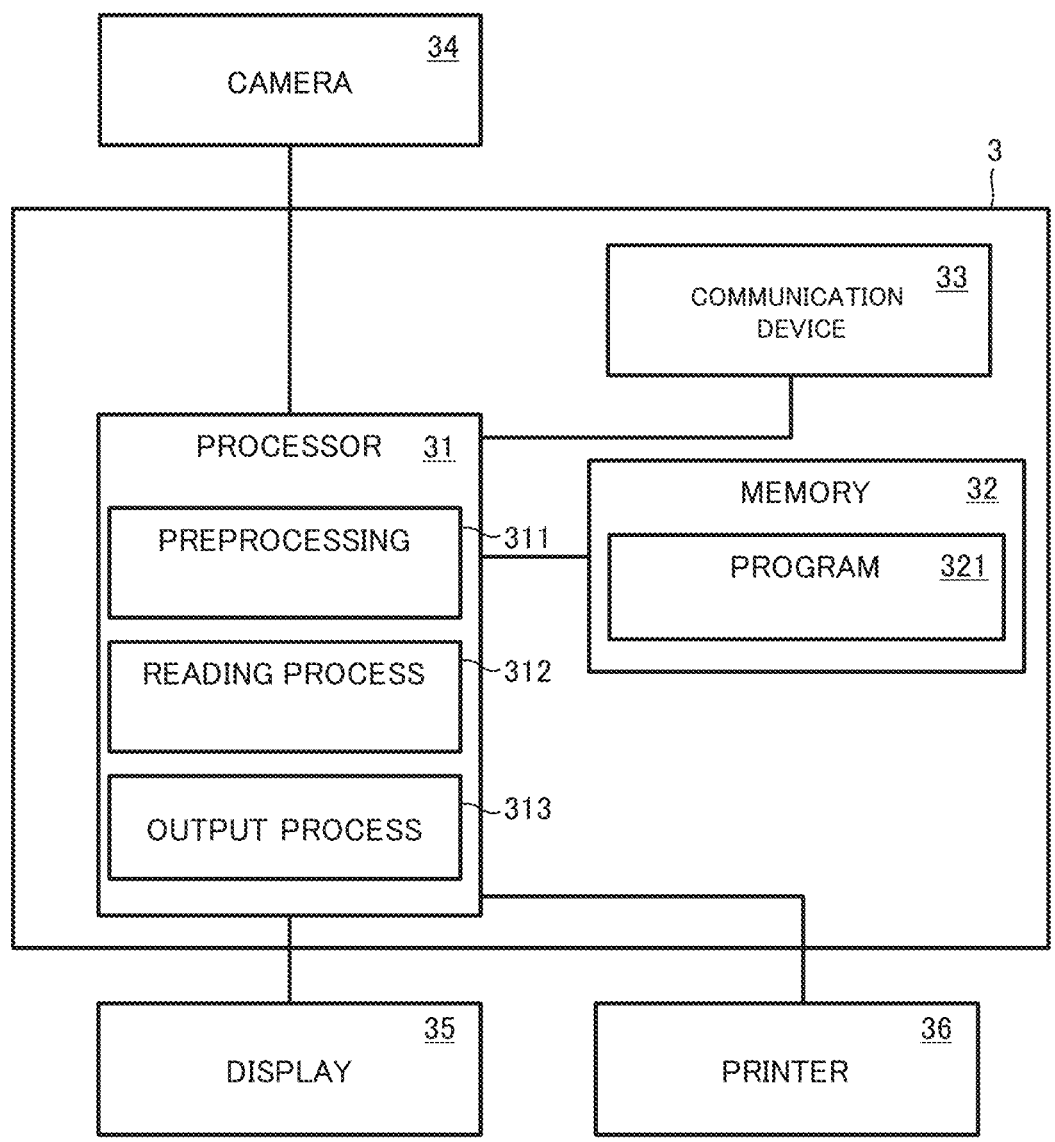
FIG. 6 is a schematic diagram showing a specific example of a configuration of a reading device according to the embodiment.

The outputted two-dimensional code 100 is read by a reading device 3, and restored to the data. FIG. 6 is a schematic diagram showing a specific example of the configuration of the reading device 3 according to the embodiment. The reading device 3 is composed of, for example, a general computer including a processor 31 and a memory 32. The processor 31 is, for example, a CPU.

The memory 32 may be a primary storage device or a secondary storage device. The memory 32 has, stored therein, a program 321 to be executed by the processor 31. The processor 31 executes the program 321 stored in the memory 32 to execute arithmetic processing.

The reading device 3 includes an input unit for inputting a captured image of the two-dimensional code 100. The input unit is, for example, a camera 34. In this case, a captured image of the two-dimensional code 100 photographed by the camera 34 is inputted to the reading device 3. As another example, the input unit may be a communication device 33 for receiving an input of a captured image from another device, or may be a reading device for reading captured image data from a storage medium.

The reading device 3 is connected to an output device for outputting the data restored from the two-dimensional code 100. The output device is, for example, a display 35. As another example, the output device may be a printer 36. Thus, the restored data is outputted.

The arithmetic processing executed by the processor 31 includes preprocessing 311. In addition, the arithmetic processing includes a reading process 312. The reading process 312 includes: applying a preset reading position to the captured image on which the preprocessing 311 has been performed; and reading information from the applied reading position in the captured image. Thus, the embedded data is restored from the two-dimensional code 100.

The arithmetic processing executed by the processor 31 includes an output process 313. The output process 313 is a process for outputting the restored data, and includes, for example, causing the display 35 to display the restored data. As another example, the output process 313 may include causing the printer 36 to print the restored data.

Figure 7:
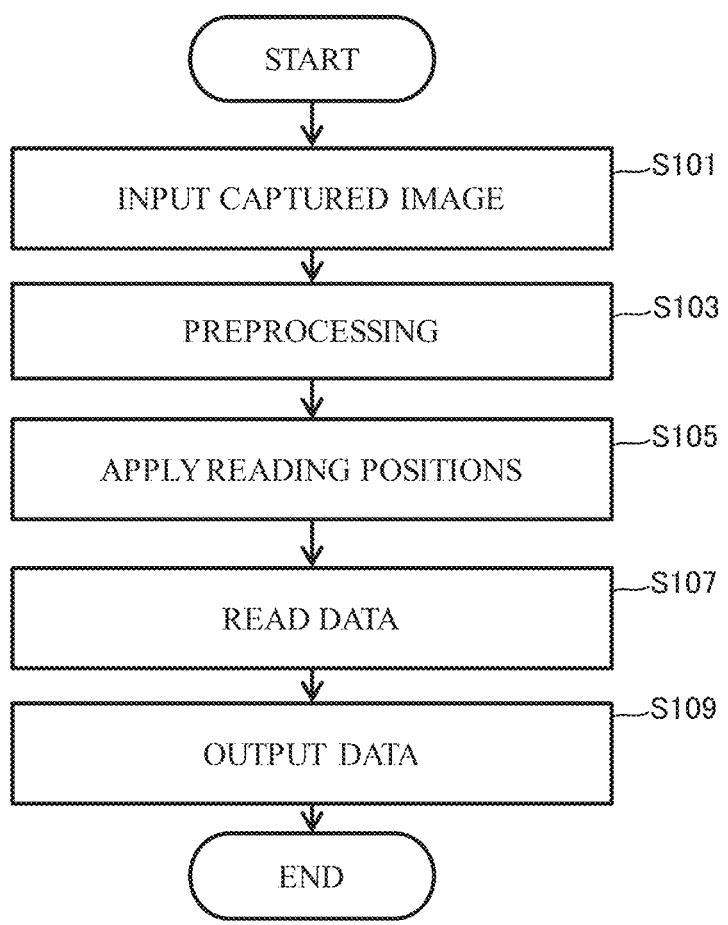
FIG. 7 is a flowchart showing an example of a two-dimensional code reading method with a reading device according to the embodiment.
Figure 8:
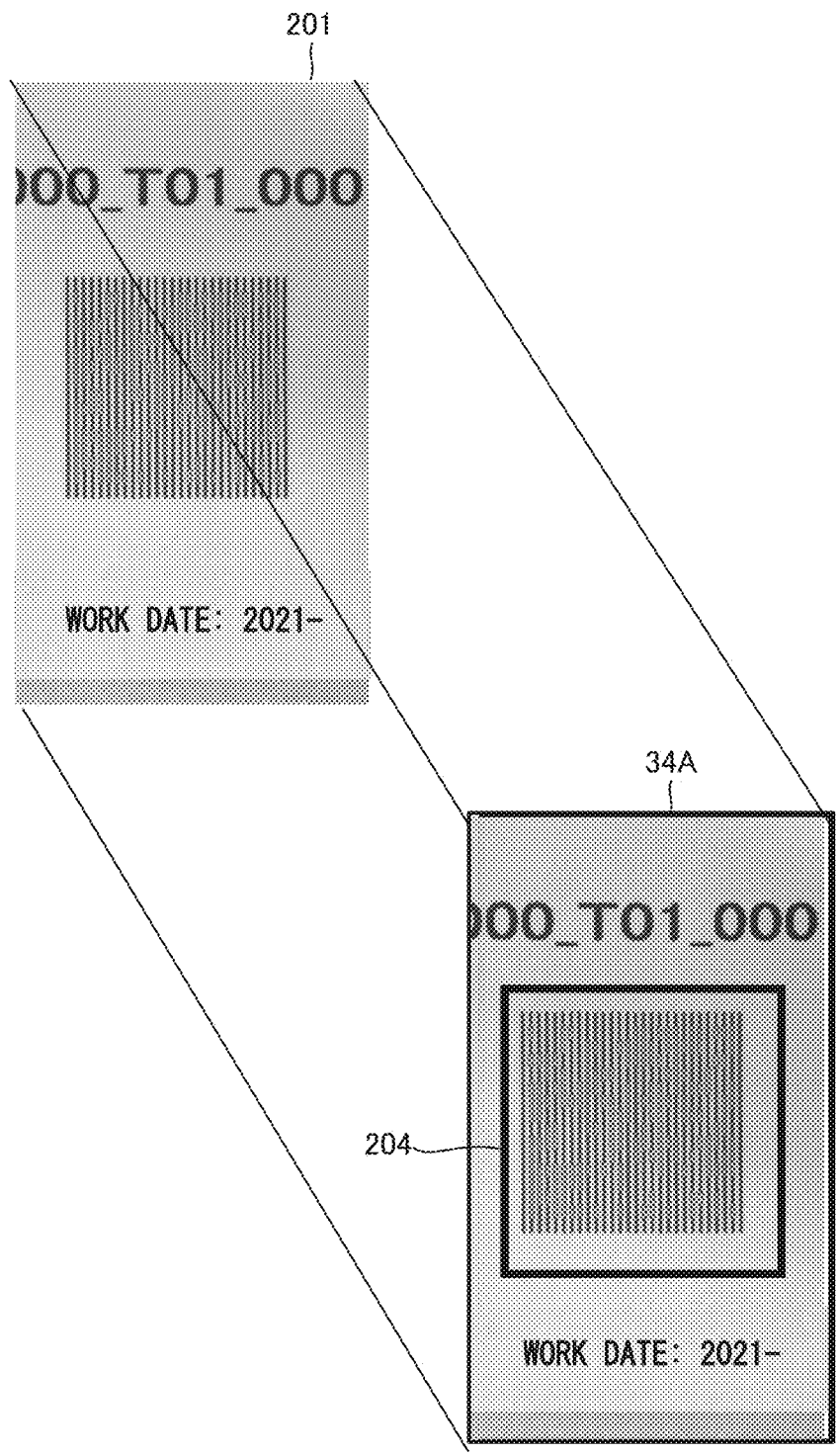
FIG. 8 illustrates a specific example of the reading method.
Figure 9:
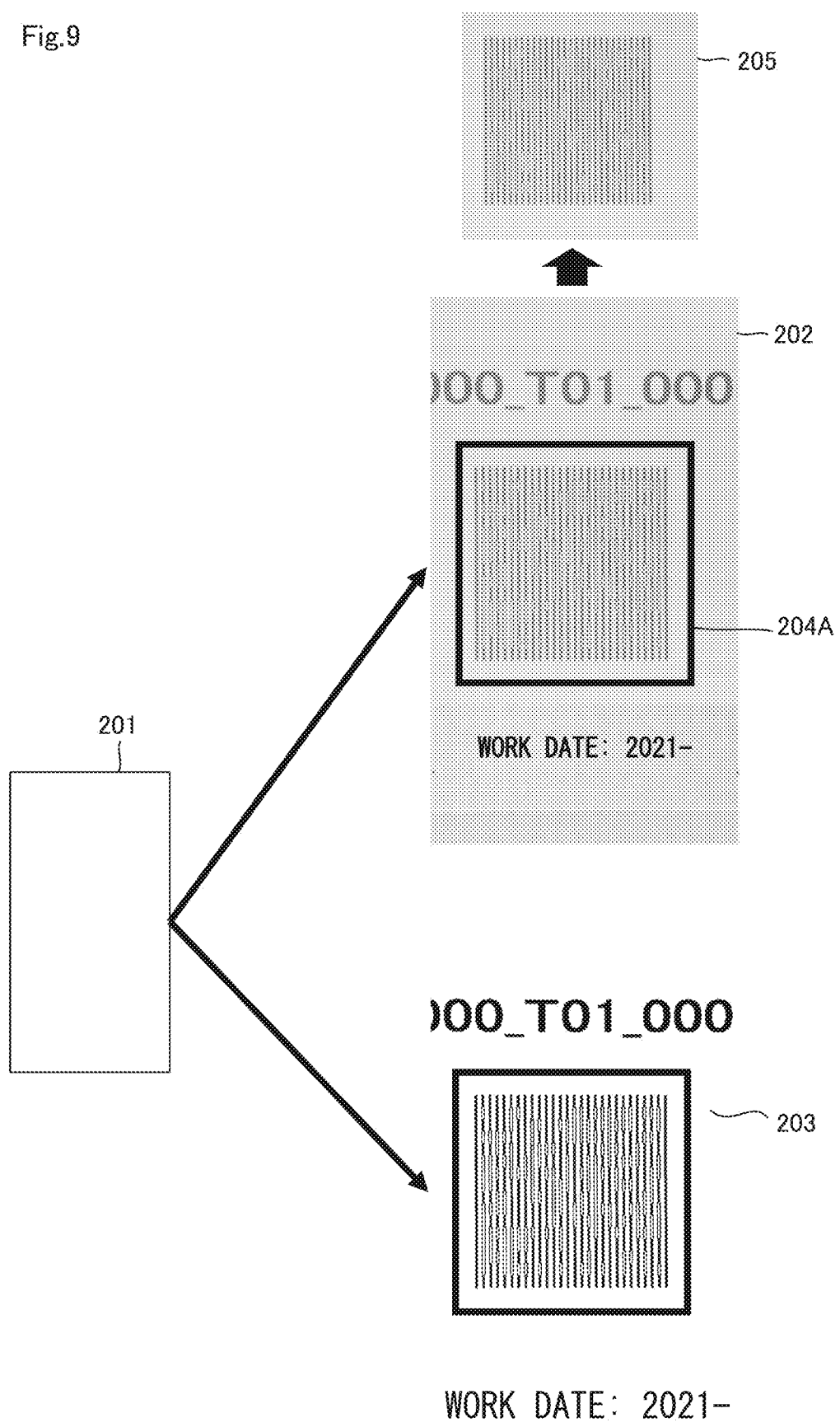
FIG. 9 illustrates a specific example of the reading method.
Figure 10:
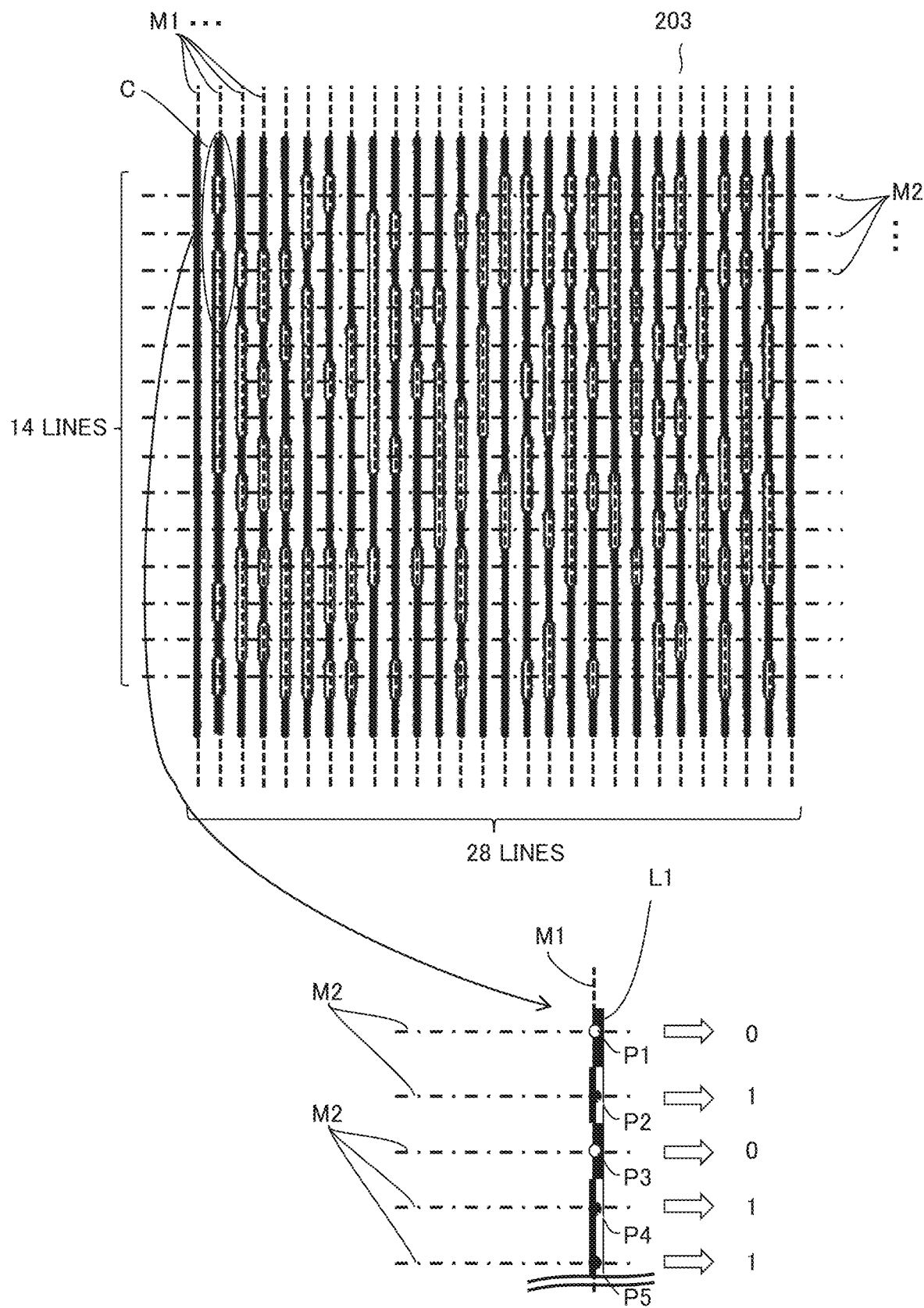
FIG. 10 illustrates a specific example of the reading method.

FIG. 7 is a flowchart showing an example of a method for reading the two-dimensional code 100 by the reading device 3 according to the embodiment. FIG. 8 to FIG. 10 illustrate a specific example of the reading method.

With reference to FIG. 7, a captured image obtained by photographing the two-dimensional code 100 is inputted to the reading device 3 (step S101). The processor 31 of the reading device 3 executes the preprocessing 311 on the captured image (step S103).

Specifically, with reference to FIG. 8, in step S101, the two-dimensional code is photographed with the camera 34, of the reading device 3, directed to the two-dimensional code. At this time, on the display 35, a guide 204 is superimposed on an image 34A for photographing. A user confirms, with the image 34A for photographing, that the two-dimensional code fits in the guide 204, and then photographs the two-dimensional code with the camera 34. Thus, a captured image 201 in which the two-dimensional code exists at the position according to the guide 204, can be obtained.

With reference to FIG. 9, in step S103, the processor 31 generates a grayscale image 202 and a binarized image 203 from the captured image 201. The grayscale image 202 thus generated enables extraction of edges to be used for tilt detection described later. The binarized image 203 thus generated allows the embedded data to be read out.

The processor 31 trims the grayscale image 202 within a predetermined trimming range to obtain a trimmed image 205. The predetermined trimming range 204A is a range according to the position of the guide 204 in the captured image 201, and is the same range as the guide 204, for example. Thus, the range to be processed can be reduced, thereby reducing the amount of subsequent processing.

The processor 31 calculates, from the trimmed image 205, a tilt of the two-dimensional code in the captured image 201. Various methods can be used for calculating the tilt. For example, the processor 31 applies an edge filter to the trimmed image 205 to extract edges. The processor 31 performs Hough transform on the obtained edge image to extract straight lines in the edge image. The processor 31 calculates the tilts of the extracted straight lines to calculate the tilt of the two-dimensional code in the captured image 201.

The processor 31 detects reference positions from the binarized image 203. The reference positions are, for example, four corners. Thus, preset reading positions can be applied to the binarized image 203 with reference to the reference positions.

Preferably, in detecting the four corners, the processor 31 tilts the binarized image 203 by a predetermined angle. The predetermined angle is an angle within a range from 0 degrees to 90 degrees, and is 5 degrees, for example. Thus, when the scanning direction is the horizontal or vertical direction, the sides of the two-dimensional code can be angled with respect to the scanning direction. Therefore, the four corners are easily detected.

Using the coordinates of the four corners extracted through the above preprocessing, the processor 31 arranges the binarized image 203 such that the two-dimensional code is disposed at a position and a tilt that allow the preset reading positions to be applicable, and applies the reading positions (step S105). The reading positions define the positions of the cells on the two-dimensional code. Thus, the processor 31 can obtain the values from the cells at the defined positions. The processor 31 obtains the data embedded in the two-dimensional code, from all the values obtained from the applied reading positions in the binarized image 203 (step S107).

The reading positions correspond to the method for generating the two-dimensional code 100, and indicate the positions of the plurality of cells of the two-dimensional code 100. In the example shown in FIG. 10, each preset reading position is represented by a straight line M1 and a straight line M2 orthogonal to each other, and an intersection of these lines indicates the reading position.

In the case of the reading positions used for reading the two-dimensional code 100 shown in FIG. 5, the intersections of the straight lines M1 and the straight lines M2 define in advance the positions inside the cells R1 to R16 of each line L, as the reading positions. In the example shown in FIG. 10, a plurality of straight lines M1 are arranged in parallel at intervals S. Specifically, 28 straight lines M1 are arranged. A plurality of straight lines M2 pass through the centers of gravity of the cells R1 to R16 of each line L. Therefore, the intersections of the straight lines M1 and the straight lines M2 are the positions inside the respective cells R1 to R16 of each line L.

In step S107, the processor 31 reads the pixel values at the positions corresponding to the intersections of the straight lines M1 and the straight lines M2 in the binarized image 203. Focusing on a portion C of the second line L1 from the bottom in the binarized image 203 shown in the upper stage of FIG. 10, and referring to an enlarged view of the portion C shown in the lower stage of FIG. 10, the processor 31 reads the pixel values at the intersections P1 to P5 of the straight lines M1 and the straight lines M2 in the binarized image 203.

In this example, the pixel values at the intersections P1 to P5 are 255 (white), 0 (black), 255, 0, 0. In step S107, the processor 31 stores the correspondence between pixel values and data values in advance, and converts the pixel values to the corresponding data values. That is, in step S107, for example, the processor 31 converts, for each reading position, the pixel value of 0 to "0", and the pixel value of 255 to "1", and arranges the values in a prescribed reading order, thereby obtaining the data D. The processor 31 outputs the obtained data (step S109).

In the two-dimensional code 100 according to the embodiment, the cells in the plurality of lines L arranged in parallel at predetermined intervals in the X direction indicate the values of data. Therefore, it is possible to easily read the data by applying the reading positions that are set in advance according to the positions of the cells as shown in FIG. 10.

3. Additional Notes

The present invention is not limited to the above-described embodiment, and various modifications thereof can be made.

REFERENCE SIGNS LIST 1 generation device
3 reading device
11 processor
12 memory
13 communication device
14 input device 15 display
16 printer
31 processor
32 memory
33 communication device
34 camera
34A image
35 display
36 printer
100 two-dimensional code
100A two-dimensional code
101 first data cell
102 second data cell
103 first density region
104 second density region
105 third density region
106 fourth density region
111 generation process
112 output process
121 program
201 captured image
202 grayscale image
203 binarized image
204 guide
204A trimming range
205 trimmed image
311 preprocessing
312 reading process
313 output process
321 program
D data
G1 distance
G2 distance
G3 distance
H height
H1 height
H2 height
L line
L1 line
P first position
P1 intersection
P2 intersection
P3 intersection
P4 intersection
P5 intersection
R1 cell
R10 cell
R11 cell
R12 cell
R13 cell
R14 cell
R15 cell
R16 cell
R2 cell
R3 cell
R4 cell
R5 cell
R6 cell
R7 cell
R8 cell
R9 cell
SG segment

The invention claimed is:

1. A two-dimensional code comprising a plurality of lines arranged in a second direction at an interval, each line including a plurality of cells that indicate a plurality of bits and are arranged in series in a first direction orthogonal to the second direction, wherein
    each of the plurality of cells is either a first data cell indicating a first value out of two values that the bits indicate, or a second data cell indicating a second value out of the two values that the bits indicate,
    the first data cell includes a first density region indicating the first value at a first position in the second direction,
    the second data cell includes a second density region indicating the second value at the first position, and a third density region adjacent to the second density region in the second direction,
    a difference in density between the first density region and the second density region is greater than a difference in density between the first density region and the third density region,
    in each of the plurality of lines, positions of opposite ends, in the second direction, of the first density region are aligned with positions of opposite ends, in the second direction, of the second density region, and
    the third density region is arranged adjacent to opposite sides, in the second direction, of the second density region, and a width in the second direction of each of the third density regions arranged adjacent to the opposite sides of the second density region is substantially equal to half a width in the second direction of the second density region.

2. The two-dimensional code according to claim 1, wherein
    in the plurality of lines, an interval between the first density region or the second density region in a certain line, and the first density region or the second density region in another line adjacent to the certain line in the second direction is not smaller than twice the width in the second direction of the first density region or the second density region.

3. The two-dimensional code according to claim 2, wherein
    in the plurality of lines, an interval between the first density region or the second density region in a certain line, and the first density region or the second density region in another line adjacent to the certain line in the second direction is not larger than three times the width in the second direction of the first density region or the second density region.

4. The two-dimensional code according to claim 1, wherein the third density region is formed from an end to the other end, in the first direction, of the second data cell.

5. A generation device configured to generate a two-dimensional code,
    the two-dimensional code comprising a plurality of lines arranged in a second direction at an interval, each line including a plurality of cells that indicate a plurality of bits and are arranged in series in a first direction orthogonal to the second direction, wherein
    each of the plurality of cells is either a first data cell indicating a first value out of two values that the bits indicate, or a second data cell indicating a second value out of the two values that the bits indicate,
    the first data cell includes a first density region indicating the first value at a first position in the second direction,
    the second data cell includes a second density region indicating the second value at the first position, and a third density region adjacent to the second density region in the second direction, a difference in density between the first density region and the second density region is greater than a difference in density between the first density region and the third density region, in each of the plurality of lines, positions of opposite ends, in the second direction, of the first density region are aligned with positions of opposite ends, in the second direction, of the second density region, and the third density region is arranged adjacent to opposite sides, in the second direction, of the second density region, and a width in the second direction of each of the third density regions arranged adjacent to the opposite sides of the second density region is substantially equal to half a width in the second direction of the second density region.

6. The generation device according to claim 5, wherein in the plurality of lines, an interval between the first density region or the second density region in a certain line, and the first density region or the second density region in another line adjacent to the certain line in the second direction is not smaller than twice the width in the second direction of the first density region or the second density region.

7. The generation device according to claim 6, wherein in the plurality of lines, an interval between the first density region or the second density region in a certain line, and the first density region or the second density region in another line adjacent to the certain line in the second direction is not larger than three times the width in the second direction of the first density region or the second density region.

8. A two-dimensional code generation method comprising causing a computer to execute a process of generating a two-dimensional code, the two-dimensional code including a plurality of lines arranged in a second direction at an interval, each line including a plurality of cells that indicate a plurality of bits and are arranged in series in a first direction orthogonal to the second direction, wherein each of the plurality of cells is either a first data cell indicating a first value out of two values that the bits indicate, or a second data cell indicating a second value out of the two values that the bits indicate, the first data cell includes a first density region indicating the first value at a first position in the second direction, the second data cell includes a second density region indicating the second value at the first position, and a third density region adjacent to the second density region in the second direction, a difference in density between the first density region and the second density region is greater than a difference in density between the first density region and the third density region, in each of the plurality of lines, positions of opposite ends, in the second direction, of the first density region are aligned with positions of opposite ends, in the second direction, of the second density region, and the third density region is arranged adjacent to opposite sides, in the second direction, of the second density region, and a width in the second direction of each of the third density regions arranged adjacent to the opposite sides of the second density region is substantially equal to half a width in the second direction of the second density region.

9. The generation method according to claim 8, wherein in the plurality of lines, an interval between the first density region or the second density region in a certain line, and the first density region or the second density region in another line adjacent to the certain line in the second direction is not smaller than twice the width in the second direction of the first density region or the second density region.

10. The generation method according to claim 9, wherein in the plurality of lines, an interval between the first density region or the second density region in a certain line, and the first density region or the second density region in another line adjacent to the certain line in the second direction is not larger than three times the width in the second direction of the first density region or the second density region.

11. A reading device for reading a two-dimensional code, comprising:

an input unit configured to input a captured image of the two-dimensional code; and a processing unit configured to process the captured image, wherein the two-dimensional code includes a plurality of lines arranged in a second direction at an interval, each line including a plurality of cells that indicate a plurality of bits and are arranged in series in a first direction orthogonal to the second direction, each of the plurality of cells is either a first data cell indicating a first value out of two values that the bits indicate, or a second data cell indicating a second value out of the two values that the bits indicate, the first data cell includes a first density region indicating the first value at a first position in the second direction, the second data cell includes a second density region indicating the second value at the first position, and a third density region adjacent to the second density region in the second direction, a difference in density between the first density region and the second density region is greater than a difference in density between the first density region and the third density region, in each of the plurality of lines, positions of opposite ends, in the second direction, of the first density region are aligned with positions of opposite ends, in the second direction, of the second density region, the third density region is arranged adjacent to opposite sides, in the second direction, of the second density region, and a width in the second direction of each of the third density regions arranged adjacent to the opposite sides of the second density region is substantially equal to half a width in the second direction of the second density region, and the processing unit performs preprocessing on the captured image, applies reading positions to the captured image on which the preprocessing has been performed, the reading positions being set in advance at the positions of the first density regions or the second density regions of the cells, and including no third density region, and converts each of pixel values at the applied reading positions in the captured image into the first value or the second value.

12. The reading device according to claim 11, wherein the preprocessing includes detecting the size and arrangement of the two-dimensional code, and converting at least one of the detected size and arrangement according to the reading positions.

13. A method for reading a two-dimensional code, wherein the two-dimensional code includes a plurality of lines arranged in a second direction at an interval, each line including a plurality of cells that indicate a plurality of bits and are arranged in series in a first direction orthogonal to the second direction, each of the plurality of cells is either a first data cell indicating a first value out of two values that the bits indicate, or a second data cell indicating a second value out of the two values that the bits indicate, the first data cell includes a first density region indicating the first value at a first position in the second direction, the second data cell includes a second density region indicating the second value at the first position, and a third density region adjacent to the second density region in the second direction, a difference in density between the first density region and the second density region is greater than a difference in density between the first density region and the third density region, in each of the plurality of lines, positions of opposite ends, in the second direction, of the first density region are aligned with positions of opposite ends, in the second direction, of the second density region, and the third density region is arranged adjacent to opposite sides, in the second direction, of the second density region, and a width in the second direction of each of the third density regions arranged adjacent to the opposite sides of the second density region is substantially equal to half a width in the second direction of the second density region, the method causing a computer to execute:

performing preprocessing on a captured image of the two-dimensional code;

applying reading positions to the captured image on which the preprocessing has been performed, the reading positions being set in advance at the positions of the first density regions or the second density regions of the cells, and including no third density region; and converting each of pixel values at the applied reading positions in the captured image into the first value or the second value.

14. The reading method according to claim 13, wherein the preprocessing includes detecting the size and arrangement of the two-dimensional code, and converting at least one of the detected size and arrangement, according to the reading positions.

\* \* \* \* \*